United States Patent [19]

Ohmae et al.

[11] Patent Number: 5,290,865

[45] Date of Patent: Mar. 1, 1994

[54] PROCESS FOR PRODUCING A LACTAM COMPOUND GRAFT COPOLYMER OF ETHYLENE COPOLYMER

[75] Inventors: Tadayuki Ohmae; Yoshiki Toyoshima, both of Chiba; Toshio Kawakita, Osaka, all of Japan

[73] Assignee: Sumitomo Chemical Company, Ltd., Osaka, Japan

[21] Appl. No.: 984,236

[22] Filed: Dec. 1, 1992

Related U.S. Application Data

[63] Continuation of Ser. No. 422,277, Oct. 16, 1989, abandoned.

[30] Foreign Application Priority Data

Oct. 15, 1988 [JP] Japan ................. 63-260298

[51] Int. Cl.$^5$ ............................................. C08L 77/00
[52] U.S. Cl. ..................................... 525/183; 525/178
[58] Field of Search ...................................... 525/183

[56] References Cited

U.S. PATENT DOCUMENTS

| | | | |
|---|---|---|---|
| 3,136,738 | 6/1964 | Hedrick et al. | 525/183 |
| 3,261,885 | 7/1966 | Craubner et al. | 525/183 |
| 3,388,186 | 6/1968 | Kray et al. | 260/857 |
| 3,770,689 | 11/1973 | von der Loos et al. | 525/183 |
| 4,990,567 | 2/1991 | Isegawa et al. | 525/183 |

FOREIGN PATENT DOCUMENTS 2150882 4/1973 France .
42-8447 2/1967 Japan .

OTHER PUBLICATIONS

Nichols et al., "From Caprolactam to Nylon & Reactive Processing in a Non-Intermeshing Twin Screw Extruder," *Polymer Processing Society Second Annual Meeting*, Apr. 1-4, 1986.

Cimmino et al., "A New Method of Preparation of a Rubber-Modified Polyamide Directly During Caprolactam Polymerization," *Polymer Engineering and Science*, vol. 25, No. 4, pp. 193-206, Mar. 1985.

Greco et al., "Rubber Modification of Polyamide-6 Effected Concurrently with Caprolactam Polymerization: Influence of Blending Conditions and Degree of Grafting of Rubber," *Polymer*, vol. 29, pp. 1418-1425, Aug. 1988.

*Primary Examiner*—Ana L. Carrillo
*Attorney, Agent, or Firm*—Sughrue, Mion, Zinn, Macpeak & Seas

[57] ABSTRACT

A process for producing a graft copolymer comprising melt-blending:
- (A) 1 to 90 parts by weight of an ethylene copolymer, based on the weight of the graft copolymer, comprising (a) 40 to 99.9% by weight of ethylene units, (b) 0 to 60% by weight of $\alpha,\beta$-unsaturated carboxylic acid alkyl ester units, and (c) 0.1 to 10% by weight of maleic anhydride units;
- (B) 0.1 to 10 moles of a lactam metal salt compound per mole of the maleic anhydride units (c) of the ethylene copolymer (A); and
- (C) 10 to 99 parts by weight of a lactam compound, based on the weight of the graft copolymer, which results in a graft copolymer having high impact strength, high flexibility, satisfactory dyeability, and well-balanced physical properties over a wide temperature range.

7 Claims, No Drawings

5,290,865

PROCESS FOR PRODUCING A LACTAM COMPOUND GRAFT COPOLYMER OF ETHYLENE COPOLYMER

This is a continuation of application Ser. No. 07/422,277 filed Oct. 16, 1989 now abandoned.

FIELD OF THE INVENTION

The present invention relates to a process for producing a graft copolymer comprising an ethylene copolymer having side chains of a polyamide structure, and more particularly to a process for producing a graft copolymer having high impact strength, high flexibility, satisfactory dyeability, and well balanced physical properties by graft-copolymerizing a lactam compound by ring-opening onto an ethylene copolymer containing maleic anhydride units.

BACKGROUND OF THE INVENTION

Polyamide resins are extensively used as engineering plastics because of their advantages in stiffness, abrasion resistance, chemical resistance, heat resistance, and electric properties. Polyamide resins, however, have disadvantages in low impact resistance, and deterioration of physical properties on moisture absorption, which are required to be improved.

On the other hand, ethylene copolymers such as an ethylene-acrylic ester-maleic anhydride copolymer have advantages of flexibility suitable for a rubber elastomer, high impact strength, no hygroscopicity, satisfactory forming characteristics, and sufficient adhesiveness to metals and polyamide resins. Ethylene copolymers, however, are inferior in abrasion resistance, chemical resistance, and heat resistance.

As described above, the advantages of polyamide resins correspond to the disadvantages of ethylene copolymers while the advantages of ethylene copolymer correspond to the disadvantages of polyamide resins. Accordingly, many investigations have been made on blending the two types of resins into an alloy to compensate the mutual disadvantages and to improve the physical properties of the resins.

JP-B-55-44108, for example, describes blending of a small amount of an ethylene copolymer such as an ethylene-acrylic ester-maleic anhydride copolymer into a polyamide resin to improve the impact strength of the polyamide resin. (The term "JP-B" as used herein means an "examined Japanese patent publication".)

JP-A-62-275157 proposes blending of a large amount of an ethylene-acrylic ester-maleic anhydride copolymer into a polyamide resin to produce a thermoplastic elastomer. (The term "JP-A" as used herein means an "unexamined published Japanese patent application".)

However, in both cases, the products are compositions merely composed microscopically of separate phases, even though physical properties can be improved by combined use of a dispersant or other additives to increase the affinity between the two phases, because the products are produced mechanically by melt-blending a highly polar polyamide resin with an essentially less polar ethylene copolymer.

The present inventors have made extensive and detailed investigation from the viewpoint mentioned above and have found that copolymers are obtained which are improved drastically in bonding and dispersing level between the ethylene copolymer structure and the polyamide structure, and have excellent physical properties through graft copolymerization of a lactam compound onto an ethylene copolymer comprising specific components by a novel process.

SUMMARY OF THE INVENTION

An object of the present invention is to provide a method for homogeneously dispersing a polyamide structure among ethylene copolymer molecules, namely a method for bonding and dispersing an ethylene copolymer structure and a polyamide structure in a molecular level for the purpose of eliminating the aforementioned limitations in mechanical melt blending and of modifying the resins to have improved physical properties.

According to an aspect of the present invention, there is provided a process for producing a graft copolymer comprising melt-blending (A) 1 to 90 parts by weight of an ethylene copolymer comprising (a) 40 to 99.9% by weight of ethylene units, (b) 0 to 60% by weight of $\alpha,\beta$-unsaturated carboxylic acid alkyl ester units, and (c) 0.1 to 10% by weight of maleic anhydride units; (B) 0.1 to 10 moles of a lactam metal salt compound per mole of maleic anhydride units; and (C) 10 to 99 parts by weight of a lactam compound, and thereby the lactam compound is graft-copolymerized by ring-opening onto a part or the whole of the maleic anhydride units.

DETAILED DESCRIPTION OF THE INVENTION

The component (A), namely an ethylene copolymer of the present invention is constituted of (a) ethylene units, (b) $\alpha,\beta$-unsaturated carboxylic acid, alkyl ester units, and (c) maleic anhydride units, wherein the ethylene units (a) being contained in 40 to 99.9% by weight, preferably in 65 to 90% by weight; the $\alpha,\beta$-unsaturated carboxylic acid alkyl ester units (b) being contained in 0 to 60% by weight, preferably 10 to 35%; and the maleic anhydride units (c) being contained in 0.1 to 10% by weight, preferably 0.5 to 5% by weight.

The monomer unit (b), namely an $\alpha,\beta$-unsaturated carboxylic acid alkyl ester, is an alkyl ester of $C_{3-8}$ unsaturated carboxylic acid such as acrylic acid and methacrylic acid. Specific examples include methyl acrylate, ethyl acrylate, n-propyl acrylate, isopropyl acrylate, n-butyl acrylate, t-butyl acrylate, isobutyl acrylate, methyl methacrylate, ethyl methacrylate, n-propyl methacrylate, isopropyl methacrylate, n-butyl methacrylate, isobutyl methacrylate, etc., among which especially preferable are methyl acrylate, ethyl acrylate, n-butyl acrylate, and methyl methacrylate.

Further, the graft copolymer may additionally include copolymers derived from copolymerization of ethylene with vinyl acetate, vinyl propionate, propylene, butene-1, isobutylene, pentene-1, or the like within the scope where the preferable properties can be held.

The examples therefor are a copolymer of ethylene-methyl acrylate-maleic anhydride, a copolymer of ethylene-methyl methacrylate-maleic anhydride, a copolymer of ethylene-ethyl acrylate-maleic anhydride, a copolymer of ethylene-ethyl methacrylate-maleic anhydride, a copolymer of ethylene-maleic anhydride, etc.

Regarding the ethylene copolymer (A), a content of the ethylene units (a) below 40% by weight, or a content of the alkyl $\alpha,\beta$-unsaturated acrylate ester units above 60% by weight is undesirable because mechanical properties such as tensile strength, and heat resistance such as heat distortion temperature will be significantly deteriorated. The maleic anhydride unit content below 0.1% by weight will lower the reaction rate of the lactam compound, while the content thereof above 10% by weight will shorten the graft chain of the lactam compound, thus such maleic anhydride unit content causing insufficient improvement of the physical properties of the polymer.

The melt index (JIS K6760) of the ethylene copolymer (A) should be within the range of 1 to 500 g/10 min., preferably 2 to 300 g/10 min. The melt index above 500 g/10 min. is undesirable in view of the mechanical properties of the resulting graft copolymers, while the melt index below 1 g/10 min. is undesirable because of the resulting poor dispersion state of the ethylene copolymer structure and the polyamide structure in the graft copolymers.

The component (B), namely lactam metal salt compounds of the present invention, include Grignard salt compounds of α-caprolactam such as caprolactammagnesium chloride, caprolactammagnesium bromide, caprolactammagnesium iodide, pyrrolidonemagnesium bromide, and piperidonemagnesium bromide; and metal salts of lactams such as caprolactamsodium, caprolactamlithium, caprolactampotassium, pyrrolidonesodium, and piperidonesodium.

Instead of using a lactam metal salt compound, a lactam and a metal compound may be added separately into a reactor to form the lactam metal salt compound in the reactor. The lactam metal salt compound is preferably diluted with a lactam compound before the addition. Since the compounds will deteriorate in properties on absorption of moisture, sufficient care should be taken that the compounds do not absorb moisture. The compounds is preferably handled under inert atmosphere such as nitrogen.

The lactam compounds (C) include α-pyrrolidone, α-piperidone, ε-caprolactam, ω-enantholactam, ω-caprylolactam, ω-decanolactam, ω-undecanolactam, ω-laurolactam, C-alkyl-substituted ε-caprolactams, etc. ε-caprolactam is particularly important in industries. The lactam compounds may be used in combination simultaneously or sequentially as well as used singly.

In producing graft copolymers of the present invention, the component (A), the ethylene copolymers, are used in an amount of 1 to 90 parts by weight, preferably 5 to 80 parts by weight, and the component (C), the lactam compounds, are used in an amount of 10 to 99 parts by weight, preferably 20 to 85 parts by weight. The use of the components outside the range specified above will not achieve the improvement of the physical properties by the molecular level dispersion of the present invention. The component (B), the lactam metal salt compounds, are used in an amount of 0.1 to 10 moles, preferably 0.5 to 2.0 moles per mole of maleic anhydride units (c) of the ethylene copolymer (A). The amount below 0.1 mole is undesirable because it lowers the graft polymerization, velocity resulting in longer graft polymerization time. The amount above 10 moles is also undesirable because polyamide ungrafted to the ethylene copolymer is liable to form in a large amount, thus lowering the physical properties of the resultant graft copolymer.

In the process for producing a graft copolymer of the present invention, a lactam compound is subjected to ring-opening graft copolymerization to a part or the whole of the maleic anhydride units by melt-blending. In blending the components, the ethylene copolymer (A), the lactam metal salt compound (B) and the lactam (C) may be melt-blended in one-stage. Preferably, however, the ethylene copolymer (A) and the lactam metal salt compound (B) are firstly melt-blended, and subsequently the lactam compound (C) is added thereto and the mixture is melt-blended to give a graft copolymer. The two-stage blending gives more homogeneous graft copolymers than single-stage blending.

In the melt-blending, preferably employed are blending machines for plastics processing such as single- or double-screw extruders, Banbury mixers, rolls, and kneeders. For example, an ethylene copolymer (A) may firstly be melt-blended with a lactam metal salt compound (B) and formed into pellets by means of an extruder, and thereafter a lactam compound (C) is added and again melt-blended by an extruder. However, by using an extruder provided with a side feeder, the ethylene copolymer (A) and the lactam metal salt compound (B) are preferably melt-blended at the first portion (or preceeding stage), and the lactam compound (C) is added at the later portion (or following stage) from the side feed and melt-blended. A volatile component such as the unreacted lactam compound may suitably be removed under a reduced pressure or vacuum, if it is necessary.

In the extruder system, the average residence time of ethylene copolymer (A) is in a range of 1 to 60 minutes, preferably 1 to 30 minutes. The average residence time above 60 minutes is undesirable because the graft copolymerization is uneconomically saturated and gellation may be caused by a side reaction. The average residence time below one minute is not sufficient for the graft copolymerization. The temperature for the graft copolymerization is selected to be higher than the melting point of any of the ethylene copolymer (A) and the lactam compound (C), and within the thermally stable range of the resultant graft copolymer. The temperature is usually in the range of 100° to 280° C., preferably 120° to 250° C.

The improvement of the physical properties by the process of the present invention is considered to result from the uniform graft copolymerization at the maleic anhydride unit sites of the ethylene copolymer causing dispersion and mixing at a molecular level of the ethylene copolymer structure and the polyamide structure. In the blending, each component is preferably mixed preliminarily in a form of powder or pellets. However, if desired, the mixing may be omitted and be fed separately and quantitatively to the blending apparatus.

The resin composition of the present invention may contain other additives such as a pigment, a dye, a reinforcing material, a filler, a heat stabilizer, an antioxidant, a weathering agent, a nucleating agent, a lubricant, an antistatic agent, a flame-retardant, a plasticizer, etc. or other polymers and the like if the additive does not impair the processability and the physical properties of the composition.

In particular, addition of a reinforcing agent or a filler like a surface treated glass fiber, carbon fiber, talc, and calcium carbonate, etc. will give highly useful materials having high rigidity and high impact strength.

The blended composition of the present invention may be molded by various molding processes such as injection molding and extrusion molding.

The present invention will be explained below according to the Examples. The present invention, however, is not limited by these Examples.

In the Examples, the physical properties were determined as described below:

Heat deformation resistance (or heat sag) was determined from the deformation of a specimen (sample size: $100 \times 10 \times 2$ t mm) held in a manner of a cantilever in a hot-air oven at 100° C.

Heat distortion temperature was determined according to JIS K7207 (Specimen thickness: 3.2 mm, flexural stress: 4.6 kgf/cm$^2$).

Flexural modules was determined according to JIS K7203 (Specimen thickness: 2 mm).

Tensile strength at break, and elongation was determined according to JIS K6301 (specimen thickness: 2 mm).

Izod impact strength was determined according to JIS K7110 (specimen thickness: 4 mm, temperature: −40° C., with V notch). The symbol "NB" denotes the strength of higher the 50 kg·cm/cm, and no breaking occurring.

Melt index was determined according to JIS K6760 (190° C., 2160 g).

The ethylene copolymers shown below were prepared for the component (A) according to the methods described in JP-A-61-60708 and JP-A-61-60709.
  Copolymer (1) E/EA/MAH=69.7/27.0/3.3% by weight; MI=32 g/10 min.
  Copolymer (2): E/MA/MAH=89.2/10.0/0.8% by weight; MI=4 g/10 min.
  Copolymer (3): E/EA/MAH=96.5/2.0/1.5% by weight; MI=12 g/10 min.
where E denotes ethylene; EA, ethyl acrylate; MA, methyl acrylate; MAH, maleic anhydride; and MI, melt index.

The lactam metal salt compound for the component (B) was prepared by reacting ε-caprolactam and ethyl magnesium bromide in tetrahydrofuran to give caprolactammagnesium bromide and mixing it with equal weight of ε-caprolactam.

EXAMPLES 1 TO 3

The ethylene copolymer and the mixture of caprolactammagnesium bromide and caprolactam (50% by weight) shown in Table were melt-blended at 200° C. under a nitrogen atmosphere by means of a double-screw extruder provided with 30 mm diameter screws (counter-rotating), a side feed device, and a vacuum vent device, and during the blending, the caprolactam shown in Table 1 was added through the side feed device provided at the middle portion of the barrel of the extruder, and melt-blended, giving the graft copolymers. Unreacted caprolactam was recovered from the vacuum vent. Each of the graft copolymers was dried at 80° C. for 12 hours, and from it the test specimens were prepared for the physical property determination with a 10 ounce injection molding machine (Toshiba, Model IS-150-V) at 260° C. and mold temperature of 70° C.

The results of the tests of the specimen were shown in Table for flexural modulus, Izod impact strength, heat distortion temperature, and heat deformation resistance (heat sag).

COMPARATIVE EXAMPLES 1 TO 3

By use of the 30 mm diameter extruder employed in the Examples, resin compositions were prepared in the same manner as in Examples by melt-blending the ethylene copolymers shown in Table, and adding polyamide 6 (made by Unitika Ltd., A1030BRL).

The physical properties of each of the composition were tested in the same manner as in Examples 1 to 3. The results are shown in Table. The compositions of the Comparative Examples 1 to 3 were inferior in the impact strength and heat resistance in comparison with those in Examples 1 to 3.

As described above, the present invention relates to a method for graft-copolymerizing a lactam compound onto an ethylene copolymer comprising maleic anhydride units, which method is novel and has never been disclosed before. The graft copolymers thus produced have remarkable advantages in balance of the properties of the molded products such as mechanical properties and thermal properties, as well as in external appearance. The graft copolymerization could not be foreseen to give such effects in the remarkable improvement in heat resistance and impact strength without impairing other properties.

The novel graft copolymers provided by the present invention are moldable easily into molded forms, films, sheets, etc. by conventional molding means employed for usual polyamide resins such as injection molding and extrusion molding, and give molded articles having satisfactory balance of properties such as impact strength, stiffness, heat resistance, etc., excellent appearance of uniformity and smoothness.

TABLE

|  | (A) Ethylene copolymer (parts by weight) | (B) (parts by weight) | (C) ε-Caprolactam (parts by weight) | Polyamide 6 (parts by weight) | Flexural modulus 23° C. (kg/cm$^2$) | Izod impact strength −40° C. (kg·cm/cm) | Heat Distortion temperature 4.6 kgf/cm$^2$ (°C.) | Heat Deformation resistance 100° C. × 2 hr (mm) |
|---|---|---|---|---|---|---|---|---|
| Example 1 | Copolymer (1) 20 | 3.0 | 78.5 | — | 18400 | 11 | 172 | — |
| Comparative Example 1 | Copolymer (1) 20 | — | — | 80 | 18000 | 6 | 171 | — |
| Example 2 | Copolymer (2) 50 | 1.8 | 49.1 | — | 7500 | NB | — | 4 |
| Comparative Example 2 | Copolymer (2) 50 | — | — | 50 | 4100 | 35 | — | 8 |
| Example 3 | Copolymer (3) 60 | 4.0 | 38.0 | — | 8300 | 20 | — | 3 |
| Comparative Example 3 | Copolymer (3) 60 | — | — | 40 | 5800 | 12 | — | 15 |

While the invention has been described in detail and with reference to specific embodiments thereof, it will be apparent to one skilled in the art that various changes and modifications can be made therein without departing from the spirit and scope thereof.

What is claimed:
1. A process for producing a graft copolymer comprising melt-blending:
  (A) 5 to 80 parts by weight of an ethylene copolymer, based on the weight of the graft copolymer, com- prising (a) 40 to 96.5% by weight of ethylene units, (b) at least 2% by weight of α,β-unsaturated carboxylic acid alkyl ester units, and (c) 0.1 to 10% by weight of maleic anhydride units;

(B) 0.1 to 10 moles of a lactam metal salt compound per mole of the maleic anhydride units (c) of the ethylene copolymer (A); and (C) 20 to 85 parts by weight of a lactam compound, based on the weight of the graft copolymer, conducting the melt-blending with an extruder for plastics molding provided with a side feed device, wherein, during melt-blending, (C) is fed into the extruder to graft it to a part or all of the maleic anhydride units of (A).

2. The process of claim 1, wherein the lactam is ε-caprolactam.

3. The process of claim 1, wherein the lactam metal salt compound (B) is a Grignard salt compound of 68-caprolactam.

4. The process of claim 1, wherein the lactam metal salt compound (B) comprises a lactam metal salt compound diluted with a lactam compound.

5. The process of claim 1, wherein the ethylene copolymer (A) and the lactam metal salt compound (B) are melt-blended first and the lactam compound (C) is added and melt-blending is repeated.

6. The process of claim 1, wherein the average residence time of the ethylene copolymer (A) in the extruder is in the range of 1 to 60 minutes.

7. The process of claim 6, wherein the range is 1 to 30 minutes.

* * * * *